United States Patent
Yamazaki et al.

(10) Patent No.: US 7,365,958 B2
(45) Date of Patent: Apr. 29, 2008

(54) DIELECTRIC CERAMICS, MULTILAYER CERAMIC CAPACITOR AND METHOD FOR MANUFACTURING THE SAME

(75) Inventors: Youichi Yamazaki, Kokubu (JP); Yumiko Itoh, Kokubu (JP); Kousei Kamigaki, Kokubu (JP); Kiyoshi Matsubara, Kokubu (JP)

(73) Assignee: Kyocera Corporation, Kyoto (JP)

( * ) Notice: Subject to any disclaimer, the term of this patent is extended or adjusted under 35 U.S.C. 154(b) by 282 days.

(21) Appl. No.: 11/258,669

(22) Filed: Oct. 25, 2005

(65) Prior Publication Data

US 2006/0087796 A1    Apr. 27, 2006

(30) Foreign Application Priority Data

Oct. 27, 2004 (JP) .............................. 2004-312454
Nov. 26, 2004 (JP) .............................. 2004-341664

(51) Int. Cl.
    *H01G 4/06* (2006.01)
(52) U.S. Cl. ................ 361/321.4; 361/321.1; 361/321.2; 361/321.5; 361/311; 361/313; 501/134; 501/136; 501/138
(58) Field of Classification Search ............ 361/321.4, 361/321.5, 321.1, 321.2, 311–313, 306.1, 361/306.3, 302–305; 501/134–139; 252/62.2, 252/62.3
See application file for complete search history.

(56) References Cited

U.S. PATENT DOCUMENTS 6,034,174 A * 3/2000 Steedman et al. .......... 524/862
6,295,196 B1 * 9/2001 Hamaji et al. ........... 361/321.2
6,346,497 B1 * 2/2002 Nakamura et al. .......... 501/138
6,437,970 B1 * 8/2002 Lee et al. .................... 361/311
6,522,521 B2 * 2/2003 Mizuno et al. .......... 361/321.4
6,556,423 B2 * 4/2003 Konaka et al. .......... 361/321.2
6,743,518 B2 * 6/2004 Ogasawara et al. ......... 428/469
6,839,221 B2 * 1/2005 Sugimoto et al. ........ 361/321.2
6,845,002 B2 * 1/2005 Moriwake et al. .......... 361/302
7,046,502 B2 * 5/2006 Murosawa et al. ...... 361/321.2
7,242,571 B2 * 7/2007 Okamatsu et al. ....... 361/321.2

FOREIGN PATENT DOCUMENTS

JP    2003-040671    2/2003
JP    2003-309036    10/2003
JP    2004-210636    7/2004

* cited by examiner

*Primary Examiner*—Nguyen T. Ha
(74) *Attorney, Agent, or Firm*—Hogan & Hartson LLP

(57) ABSTRACT

Crystal grains mainly composed of barium titanate have a mean grain size of not more than 0.2 μm. The volume per unit cell V that is represented by a product of lattice constant (a, b, c) figured out from the X-ray diffraction pattern of the crystal grains is not more than 0.0643 $nm^3$. Thereby, a dielectric ceramics having high relative dielectric constant can be obtained. A multilayer ceramic capacitor comprises a capacitor body and an external electrode that is formed at both ends of the capacitor body. The capacitor body comprises dielectric layers composed of the dielectric ceramics, and internal electrode layers. The dielectric layers and the internal electrode layers are alternately laminated.

4 Claims, 4 Drawing Sheets

Alternating-current impedance measurement before and after HALT

Equivalent circuit for analysis

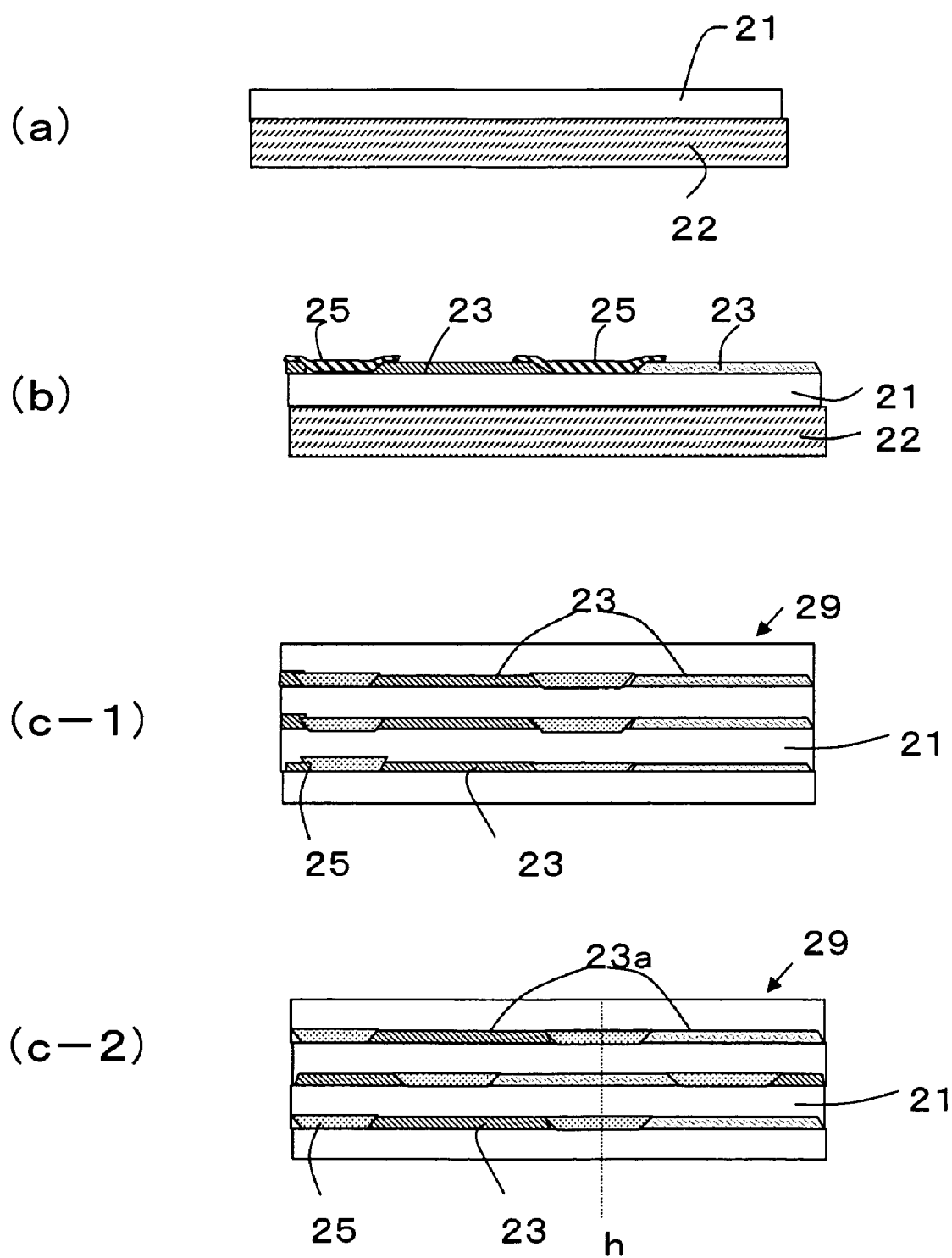

DIELECTRIC CERAMICS, MULTILAYER CERAMIC CAPACITOR AND METHOD FOR MANUFACTURING THE SAME

Priority is claimed to Japanese Patent Application No. 2004-312454 filed on Oct. 27, 2004, and Japanese Patent Application No. 2004-340347 filed on Nov. 26, 2004, the disclosure of which is incorporated by reference in its entirety.

BACKGROUND OF THE INVENTION

1. Field of the Invention

The present invention relates to a dielectric ceramics, a multilayer ceramic capacitor using the same and a method for manufacturing them.

2. Description of Related Art

In recent years, as mobile devices such as cellular phones are more widely used and semiconductor devices that are the main part of a personal computer have higher speed and higher frequency, a multilayer ceramic capacitor for these electronics is increasingly required to have small size and large capacity.

To meet such requirement, in a multilayer ceramic capacitor (MLC), efforts have been made for smaller size and larger capacity, by making dielectric layers thinner to enhance electrostatic capacity and increasing the number of lamination. Therefore, to meet the demand for thinner multilayered dielectric layers as above, in a dielectric layer constituting a multilayer ceramic capacitor, attempts have been made for atomization and better relative dielectric constant in dielectric powder constituting a dielectric ceramics (For example, Japanese Unexamined Patent Publication No. 2004-210636).

For example, the above publication mentions that barium titanate powder that is typical dielectric powder is obtained in the form of fine grains by mixing barium hydroxide aqueous solution and Ti alkoxide solution and ripening the mixture in a vessel for a predetermined time followed by dehydration and drying.

However, barium titanate powder obtained through the above-mentioned liquid phase method is dried under the condition of 110° C. and three hours after mixing and ripening. This condition is employed to only remove moisture contained in the mixture. The barium titanate powder has much crystal water and impurities such as hydroxide. The barium titanate powder so obtained is made so small as to have a mean grain size of 0.05 µm (50 nm), while having a lattice constant larger than the value figured out from a single crystal (a=0.4032 nm, V=0.065548 nm$^3$) and, in terms of crystal structure, mainly having cubic crystals. Therefore, there has been a problem that a dielectric ceramics prepared by using the dielectric powder so obtained has a low relative dielectric constant.

Meanwhile, grains have been made finer to produce a flat dielectric layer that can meet the demand for thinner layers and to prevent reliability from being lowered by increasing an applied electric field to a multilayer ceramic capacitor due to thinner layers. For example, Japanese Unexamined Patent Publication No. 2003-309036 mentions that a dielectric layer is formed so that the thickness of dielectric layer t and the maximum diameter of glass grain D can satisfy the relation of D/t≦0.5, thereby attaining high insulation and improving reliability in high temperature load test. In addition, Japanese Unexamined Patent Publication No. 2003-40671 describes thinner dielectric layers and the use of barium titanate powder having a mean grain size of 0.4 µm to prevent a decrease in relative dielectric constant that occurs when applying DC bias.

According to Ferroelectrics, 1998, Vols. 206-207, pp 337-353, M. H. FREY, Z. XU, P. HAN and D. A. PAYNE, for example, barium titanate used mainly for a dielectric material of the above-mentioned multilayer ceramic capacitor has perovskite crystal structure, and it is known to show a very high relative dielectric constant of about 4800.

However, if fine barium titanate powder according to Japanese Unexamined Patent Publication No. 2003-309036, for example, is used to make dielectric layers thinner in manufacturing a multilayer ceramic capacitor, abnormal grain growth occurs during firing at atmospheric pressure. Therefore, crystal grains constituting a dielectric layer cannot have uniform grain size, and large crystal grains resulting from grain growth are present in part. There has been a problem that a multilayer ceramic capacitor having such crystal grains has larger temperature characteristic of relative dielectric constant and lower insulation, in particular, lower reliability in high temperature load test.

SUMMARY OF THE INVENTION

The main advantage of the present invention is to obtain a dielectric ceramics that is composed of crystal grains having a high relative dielectric constant while being atomized.

The other advantage of the present invention is to obtain a multilayer ceramic capacitor that has high relative dielectric constant, stable temperature characteristic and insulation as well as high reliability, even if dielectric layers have smaller thickness.

The dielectric ceramics of the present invention has a mean grain size of not more than 0.2 µm, preferably not more than 0.15 µm, and contains crystal grains mainly composed of barium titanate. The crystal grains have a volume per unit cell V of not more than 0.0643 nm$^3$. V is represented by a product of lattice constant (a, b, c) figured out from the X-ray diffraction pattern of the crystal grains. Thereby, the dielectric ceramics of the present invention can attain a high relative dielectric constant.

The method for manufacturing such a dielectric ceramics comprises the steps of: (a) obtaining dielectric primary powder whose mean grain size is not more than 0.1 µm through any one liquid phase method selected from oxalic acid method, sol-gel method and hydrothermal synthesis method; (b) obtaining dielectric powder by drying and heating the dielectric primary powder with a zeolitic drying agent in the atmosphere of a temperature 300 to 500° C. at atmospheric pressure; and (c) firing a forming body that is molded into a predetermined shape with the dielectric powder.

The first multilayer ceramic capacitor of the present invention comprises dielectric layers composed of the above-mentioned dielectric ceramics and internal electrode layers. The dielectric layers and the internal electrode layers are alternately laminated.

The second multilayer ceramic capacitor of the present invention comprises a capacitor body wherein dielectric layers and internal electrode layers are alternately laminated. The dielectric layers have crystal grains sintered through a grain boundary layer. (a) Crystal grains constituting the dielectric layer have a mean grain size of not more than 0.2 µm. (b) The crystal grains are mainly composed of barium titanate. (c) When the volume per unit cell $V_{bulk}$ is represented by a product of lattice constant (a, b, c) figured out from the X-ray diffraction pattern of the dielectric layer, and the volume per unit cell $V_{powder}$ is represented by a product of lattice constant (a, b, c) figured out from the X-ray diffraction pattern of crystal grains obtained by grinding the dielectric layer, $V_{bulk}$ and $V_{powder}$ satisfy the relation Of $V_{bulk}/V_{powder} \geq 1.005$.

This makes it possible to obtain a multilayer ceramic capacitor that has a high relative dielectric constant, excellent temperature characteristic and insulation as well as high reliability, even if a dielectric layer has smaller thickness.

The multilayer ceramic capacitor of the present invention is manufactured by firing a capacitor body forming body wherein green sheets and internal electrode patterns are alternately laminated. The green sheets contain a mixture of dielectric powder mainly composed of barium titanate and glass powder. According to this method for manufacturing a multilayer ceramic capacitor, the second multilayer ceramic capacitor can be easily manufactured under the following conditions: (A) the dielectric powder has a mean grain size of not more than 0.2 µm; (B) glass powder has a softening point of not less than 650° C. and a thermal expansion coefficient of not more than $9.5 \times 10^{-6}/°$ C.

BRIEF DESCRIPTION OF THE DRAWINGS

FIG. 4 is a flow chart showing the method for manufacturing a multilayer ceramic capacitor of the present invention.

DESCRIPTION OF PREFERRED EMBODIMENTS (Dielectric Ceramics)

Figure 1:
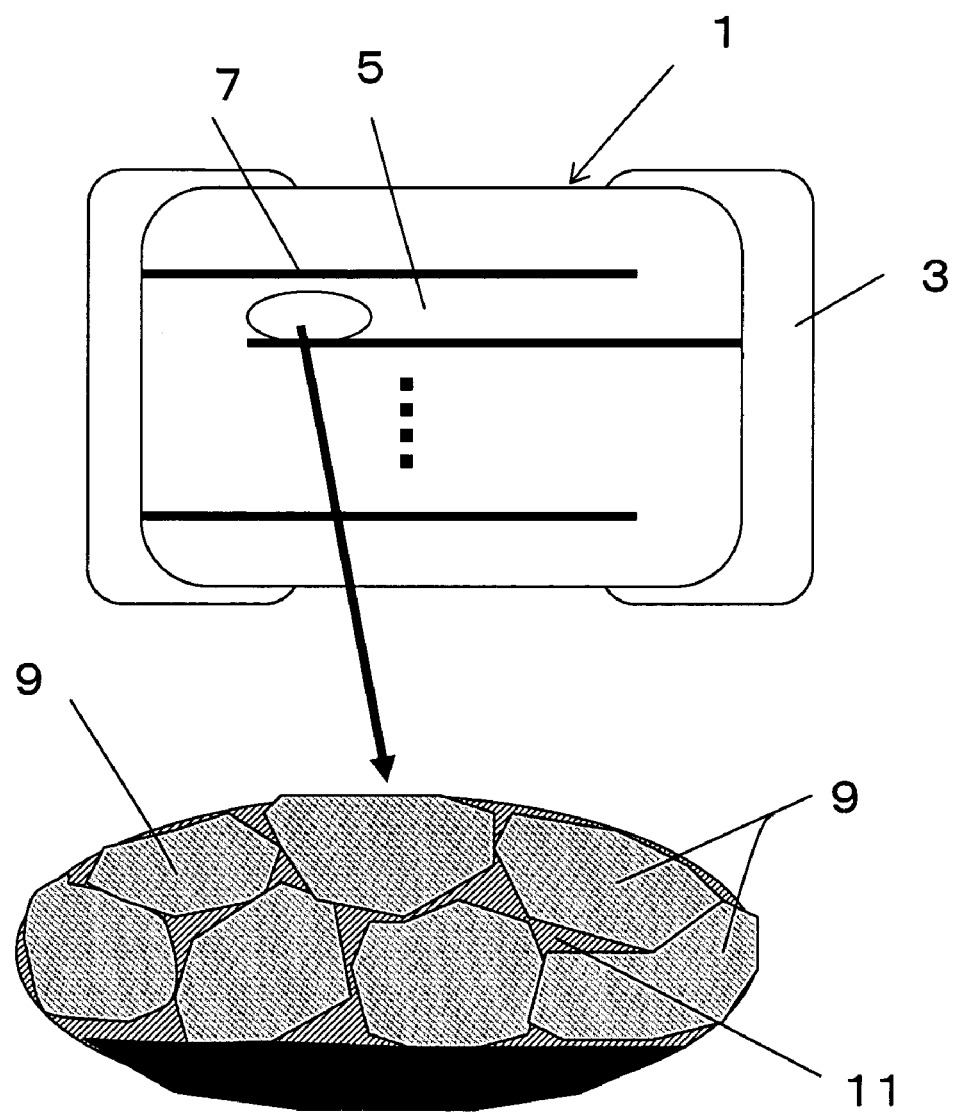
FIG. 1 is a vertical sectional view of the multilayer ceramic capacitor of the present invention.

In the dielectric ceramic of the present invention, crystal grains mainly composed of barium titanate have a mean grain size of not more than 0.2 µm, preferably not more than 0.15 µm, and the volume per unit cell V that is represented by a product of lattice constant (a, b, c) figured out from the X-ray diffraction pattern of the crystal grains is not more than 0.0643 $nm^3$.

The volume V is preferably not less than 0.062 $nm^3$ in terms of forming perovskite crystal structure. The volume per unit cell V that is represented by a product of lattice constant (a, b, c) is more preferably in the range from 0.063 to 0.064 $nm^3$.

The mean grain size of crystal grains is more preferably not less than 0.03 µm in terms of attaining a high relative dielectric constant. The ceramics density of the dielectric ceramics of the present invention is 5.8 to 5.9 $g/cm^3$. In addition, cubic crystals and tetragonal crystals coexist in crystal grains. Therefore, it is desirable in terms of higher dielectric constant that the ratio of lattice constant c/a is 1.005 to 1.01, especially 1.006 to 1.009.

When crystal grains have a mean grain size of more than 0.2 µm, particularly more than 0.15 µm, the dielectric layer of a multilayer ceramic capacitor has a smaller number of grain boundaries per unit thickness, making it impossible to attain high insulation. Moreover, when the volume per unit cell V that is represented by a product of lattice constant (a, b, c) is more than 0.0643 $nm^3$, relative dielectric constant becomes lower.

In the dielectric ceramics of the present invention, it is preferable in terms of higher dielectric constant that the stress figured out from the gap between the peak positions when comparing the X-ray diffraction pattern of dielectric ceramics surface with that of barium titanate single crystal is not less than 1 MPa in absolute value. Particularly when not less than 100 layers are laminated in a multilayer ceramic capacitor, compressive stress that influences a dielectric layer is added due to the difference in thermal expansion coefficient with an internal electrode layer mainly composed of nickel, and the stress is more preferably not less than 5 MPa in absolute value.

(Method for Manufacturing a Dielectric Ceramics)

The method for manufacturing a dielectric ceramics in the present invention will be now described. Through any one liquid phase method selected from oxalic acid method, sol-gel method and hydrothermal synthesis method, dielectric primary powder having a mean grain size of not more than 0.1 µm is obtained. Among the above-mentioned methods, sol-gel method is particularly preferable in terms of high monodispersibility. In this case, $Ba(OH)_2$ is used as a Ba source, and $TiO_2$ is used as a Ti source. The ratio of Ba/Ti is preferably in the range from 0.995 to 1.005 in terms of improved relative dielectric constant and sinterability. Slurry obtained by mixing Ba and Ti sources undergoes preliminary drying under the condition of atmospheric pressure and 200° C.

The dielectric primary powder so obtained is dried and heated with a zeolitic drying agent in the atmosphere of a temperature 300 to 500° C., in particular 350 to 450° C. at atmospheric pressure to obtain dielectric powder. Preferably, the dielectric powder so obtained has a grain size variation (CV value) of not more than 50%.

As a zeolitic drying agent, molecular sieve, metallosilicate and cloverite are suitable. Especially, in terms of heat resistance, molecular sieve is more preferable. The specific surface of a zeolitic drying agent is preferably not less than 400 $m^2/g$ and, in terms of drying efficiency and durability, more preferably 500 to 700 $m^2/g$.

The amount of a zeolitic drying agent is preferably 5 to 20 parts by weight to 100 parts by weight of dielectric primary powder. It is preferable that the temperature is below 600° C. in order to maintain the specific surface of a zeolitic drying agent. When the temperature is higher than the above, a zeolitic drying agent changes its nature, reducing its specific surface.

Next, using the dielectric powder so obtained as a main component, the forming body molded in a predetermined shape is prepared and then fired. The above dielectric powder is molded together with a binder, forming a predetermined shape of (for example, discoidal) forming body to be a single layer capacitor.

To form a multilayer ceramic capacitor, the above dielectric powder is mixed with a binder and a solvent to obtain slurry. This slurry goes through sheet forming method such as doctor blade method to form a sheet-like forming body having a thickness of 1 µm, for example. Next, a conductor pattern is printed on the sheet-like forming body, thereby forming a sheet in which a conductor pattern is formed. A plurality of these sheets are laminated to form a multilayer forming body. Then, through firing at a temperature nearly equal to the sintering temperature of conductor pattern, a multilayer ceramic capacitor is obtained.

When dielectric primary powder obtained through liquid phase method has a mean grain size of not less than 0.1 μm, crystal grains obtained after sintering becomes larger, lowering insulation resistance. When the drying temperature of dielectric primary powder is not more than 300° C., drying is not enough, making it difficult to eliminate such impurities as hydroxide in the powder that come from liquid phase method and to induce grain growth. Meanwhile, when the temperature is over 600° C., the mean grain size of dielectric primary powder becomes too large to obtain a desired size of dielectric powder and thinner green sheets. When pressure is below or over atmospheric pressure, an industrially high-cost decompression device or pressure device is needed, making it difficult to manufacture dielectric powder as raw material powder at a low cost.

In other words, compared to conventional dielectric powder that is only dried, impurities are eliminated in the surface and the interior of dielectric powder obtained through the above process. Therefore, more defects are produced and lattices in the surface portion are more easily shrunk, thereby adding compressive stress to the interior of powder and making the lattice constant smaller across the board. This leads to a decrease in the volume per unit cell.

(Multilayer Ceramic Capacitor)

The multilayer ceramic capacitor of the present invention will be described in detail, referring to the schematic sectional view of FIG. 1. FIG. 1 is a schematic sectional view showing the multilayer ceramic capacitor of the present invention. The partially enlarged view in FIG. 1 is a pattern diagram showing crystal grains 9 and a grain boundary layer 11 that constitute a dielectric layer. In the multilayer ceramic capacitor of the present invention, an external electrode 3 is formed at both ends of a capacitor body 1. The external electrode 3 is formed by baking Cu, or an alloy paste of Cu and Ni. The capacitor body 1 comprises a dielectric layer 5 and an internal electrode layer 7 that are alternately laminated. The dielectric layer 5 is composed of crystal grains 9 and a grain boundary layer 11.

Thickness of the dielectric layer 5 is preferably not more than 1.6 μm for a multilayer ceramic capacitor to have smaller size and larger capacity. When the dielectric layer 5 has small thickness, the effectiveness of the structure including dielectric crystal grains is increased.

Moreover, in the present invention, to stabilize variations in electrostatic capacity and capacity-temperature characteristic, thickness variation in the dielectric layer 5 is more desirably within 10%.

The internal electrode layer 7 is preferably a base metal such as nickel (Ni) and copper (Cu) in terms of curbing manufacturing cost even if a larger number of layers are laminated. In particular, nickel (Ni) is more desirable in order to co-fire with the dielectric layer 5 according to the present invention.

The crystal grains 9 constituting the dielectric layer 5 mainly comprise perovskite barium titanate crystal grains. That is, the crystal grains 9 of the present invention are mainly composed of barium titanate. For this reason, high relative dielectric constant is shown as above. Since the crystal grains 9 constituting the dielectric layer 5 according to the present invention have high insulation and reliability in high temperature load in the above dielectric layer 5, it is important that its mean grain size is not more than 0.2 μm. When the mean grain size is larger than 0.2 μm, high insulation and reliability in high temperature load cannot be attained. The mean grain size is represented by D50 that is calculated from a volume-integrated value in grain size distribution.

On the other hand, the grain size lower limit of the crystal grains 9 is preferably not less than 0.05 μm in order to improve the relative dielectric constant of the dielectric layer 5 and decrease the temperature dependence of relative dielectric constant.

It is desirable that the crystal grains 9 contain Mg, a rare earth element and Mn. Preferably, to 100 parts by weight of barium titanate component, 0.04 to 0.3 parts by weight of Mg, 0.5 to 2 parts by weight of a rare earth element and 0.04 to 0.3 parts by weight of Mn are contained in the crystal grains 9. Since Mg, a rare earth element and Mn are derived from a sintering additive, some of these elements go into solid solution in the crystal grains 9 while many are present in the grain boundary layer 11.

In the dielectric layer 5, Mg and a rare earth element are a component constituting the core-shell structure in a crystal grain. Meanwhile, Mn can compensate for oxygen defect in the crystal grains 9 produced by firing in the reducing atmosphere and increase insulation and high temperature load lifetime.

In the dielectric layer 5 of the present invention, it is desirable that a rare earth element is contained with the highest concentration in the grain boundary layer 11 that is the grain surface, and has a concentration gradient of not less than 0.05 atomic %/nm from the surface to the interior of the crystal grain 9. When a rare earth element has such concentration gradient, relative dielectric constant and high temperature load lifetime can be improved and also capacity-temperature characteristic can satisfy X5R standard. As a rare earth element in the present invention, it is preferable to use at least one selected from La, Ce, Pr, Nd, Sm, Gd, Tb, Dy, Ho, Y, Er, Tm, Yb, Lu, and Sc. Particularly, Y is preferable for the crystal grains 9 to attain a higher dielectric constant and higher insulation.

Since, in the dielectric layer 5, the relative dielectric constant can keep high and the resistance in acceleration test can be increased, it is desirable that the amount of alumina impurities contained in a dielectric ceramics is not more than 1% by weight.

As above, the crystal grain 9 constituting the dielectric layer 5 has core-shell structure where Mg and a rare earth element derived from a sintering additive are more distributed in the grain surface rather than in the grain center. As a result, a high dielectric constant is attained and the grain surface has a characteristic of high insulation. The relative dielectric constant of the dielectric layer in the present invention is preferably not less than 2000, in particular, not less than 2500.

In the dielectric layer 5 of the present invention, when the volume per unit cell $V_{bulk}$ is represented by a product of lattice constant (a, b, c) figured out from X-ray diffraction pattern and the volume per unit cell $V_{powder}$ is represented by a product of lattice constant (a, b, c) figured out from the X-ray diffraction pattern of crystal grains that are obtained by grinding the dielectric layer, $V_{bulk}$ and $V_{powder}$ satisfy the relation of $V_{bulk}/V_{powder} \geq 1.005$. This relation comes from residual stress that the grain boundary layer 11 puts on the crystal grains 9 in a dielectric ceramics. When the difference in thermal expansion coefficient between the crystal grain 9 and the grain boundary layer 11 is large, the relative dielectric constant becomes large. In other words, as glass powder that is an additive has a smaller thermal expansion coefficient, greater effect is shown. On the other hand, when $V_{bulk}/V_{powder}$ is less than 1.005, the relative dielectric constant is prevented from improving. In finding out the relation of $V_{bulk}/V_{powder}$, the indices (h k l) from X-ray diffraction pattern reach a peak in the range of 1 to 4, for example, h: (1 0 0), (2 0 0), (4 0 0). The same is true of the other "k" and "l".

In the crystal grain 9 constituting the dielectric layer 5, when a lattice constant ratio satisfies the relation of c/a≧1, a higher relative dielectric constant can be attained. The lattice constant ratio c/a is preferably not less than 1.005 in order to improve the relative dielectric constant of the dielectric layer 5.

Furthermore, in the present invention, the mole ratio of A site for barium and B site for titanate in barium titanate constituting the crystal grains 9 satisfies the relation of A site/B site≧1, preferably, A site/B site≧1.003 in order to inhibit grain growth. The above definition of the ratio A site/B site makes it possible to inhibit grain growth of the crystal grains 9 and stabilize the temperature characteristic of relative dielectric constant.

In the present invention, the relation of $V_{bulk}/V_{powder}$≧1.005 is satisfied. This is because the crystal grains 9 originally have a larger thermal expansion coefficient than the grain boundary layer 11, and once the sintered body is cooled down after sintering, the crystal grains 9 are drawn to the grain boundary layer 11. Therefore, when the sintered body is ground to release the crystal grains 9 from the grain boundary layer 11, the volume turns larger.

Figure 2:
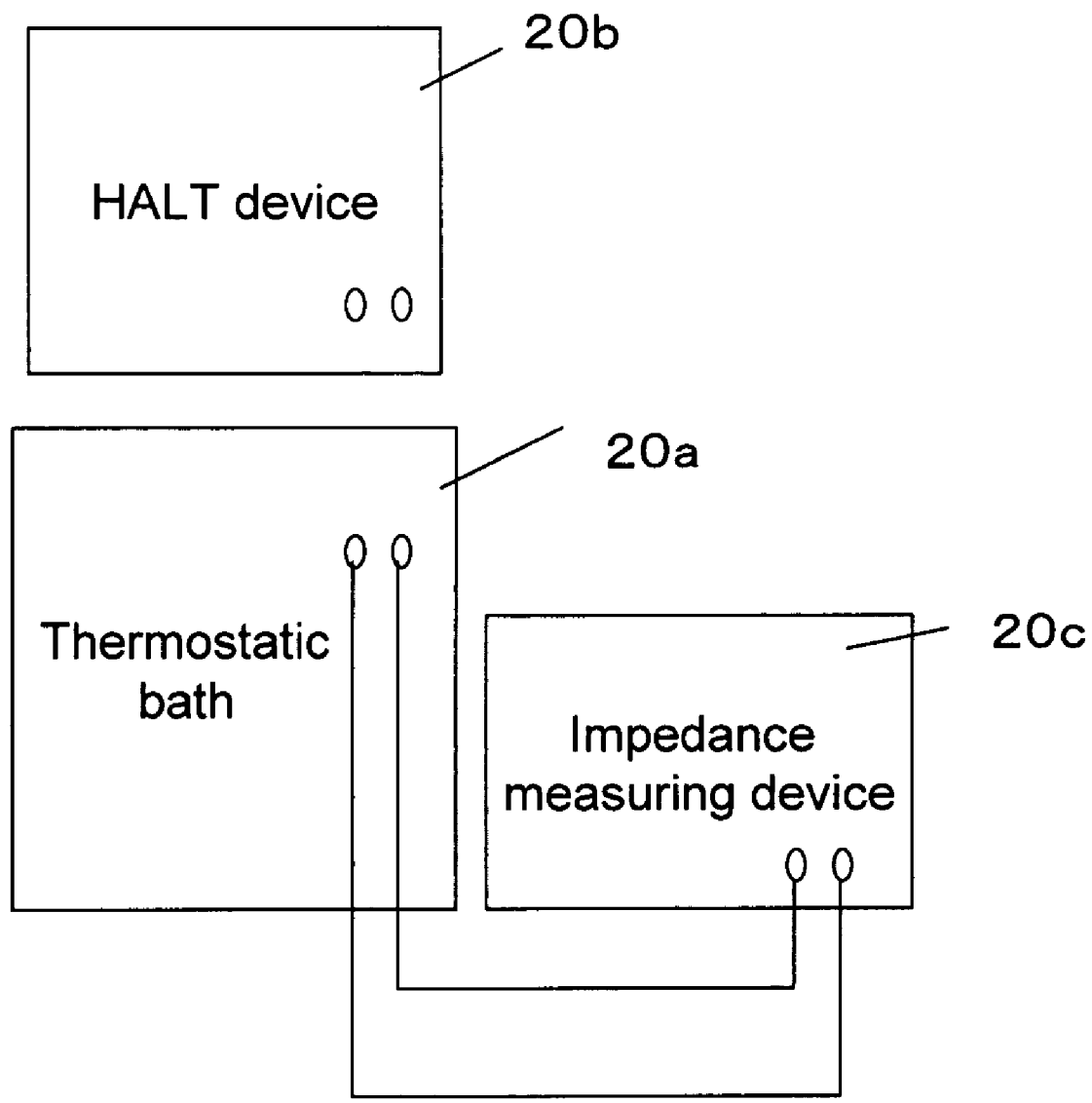
FIG. 2 is a pattern diagram showing the way to evaluate the resistance of grain boundary in a dielectric layer, using alternating-current impedance measurement.
Figure 3:
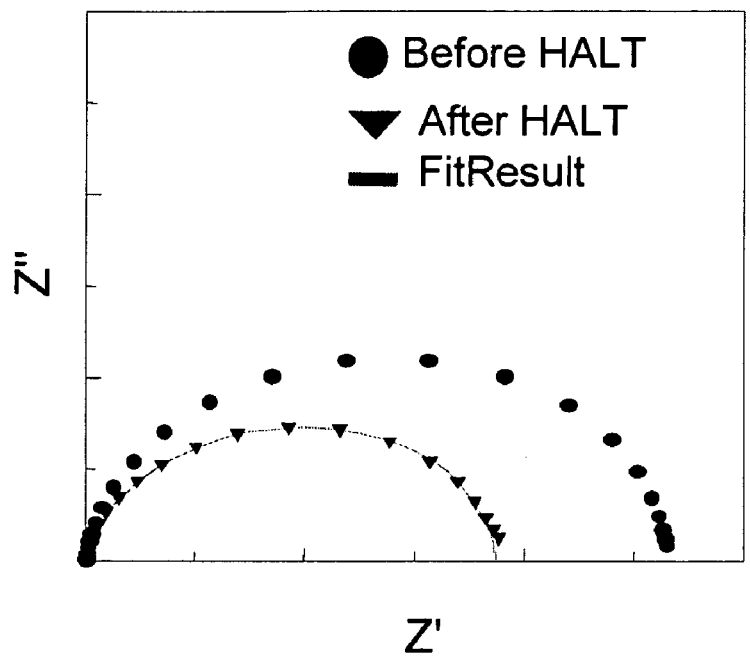
FIG. 3(a) is a graph showing one example of evaluations on the resistance of grain boundary in a dielectric layer, using alternating-current impedance measurement.
FIG. 3(b) is a circuit diagram showing an equivalent circuit to analyze the resistance of grain boundary in a dielectric layer.
Figure 3:
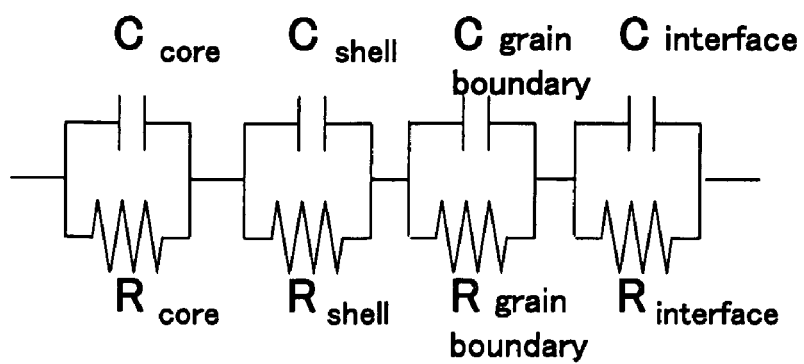

FIG. 2 is a pattern diagram showing the way to evaluate the resistance of grain boundary in a dielectric layer, using alternating-current impedance measurement. In FIG. 2, 20a is a thermostatic bath in which a sample multilayer ceramic capacitor is placed and a temperature is controlled. 20b is a HALT (Highly Accelerated Life Test) device to add direct-current voltage to the sample. 20c is an impedance measuring device having alternating-current power supply. FIG. 3(*a*) is a graph showing the evaluations on resistance of grain boundary in a dielectric layer, using alternating-current impedance measurement. FIG. 3(*b*) is a circuit diagram showing an equivalent circuit for analysis.

In the present invention, a multilayer ceramic capacitor is exposed to the high temperature loading atmosphere of a higher temperature than the Curie temperature shown by perovskite barium titanate crystal grains that constitute the dielectric layer 5, and a voltage as high as not less than one third of the rated voltage of the multilayer ceramic capacitor. Before and after exposing the multilayer ceramic capacitor to this high temperature loading atmosphere, under the same conditions, the rate of resistance decrease of the grain boundary layer 11 in the dielectric layer 5 is measured through alternating-current impedance measurement. FIG. 3(*a*) is a graph (Cole-Cole plot) showing impedance change in the core (central portion) of the crystal grain 9 in the multilayer ceramic capacitor of the present invention, its shell (peripheral portion), the grain boundary layer and the interface between the internal electrode layer 7 and the dielectric layer 5. As shown in the equivalent circuit of FIG. 3(*b*), in this evaluation, the dielectric layer 5 is divided into four elements: core (central portion), shell (peripheral portion), the grain boundary layer 11 and the interface between the internal electrode layer 7 and the dielectric layer 5. The horizontal axis of the graph indicates the real part of impedance signal and the vertical axis indicates the imaginary part. The graph showing impedance change is obtained by fitting of the difference between before and after Highly Accelerated Life Test (HALT), and simulation. The present invention especially focuses on resistance change in the grain boundary layer 11. The rate of change of the real part (the rate of change per load time), that is, the rate of resistance decrease of grain boundary in a dielectric layer is desirably not more than 0.5%/min.

This evaluation can be made by dividing the Cole-Cole plot before and after Highly Accelerated Life Test (HALT) in FIG. 3(*a*) into the above four elements with a special software. Comparing before and after high temperature load process, ion diffusion and electron transfer become significant in the dielectric layer 5, and the rate of resistance decrease of the grain boundary layer 11 can be clearly observed. For this reason, preferably, the temperature is 1.5 times as high as the Curie temperature and the voltage is not less than two fifth V of the rated voltage.

(Method for Manufacturing a Multilayer Ceramic Capacitor)

Next, the method for manufacturing a multilayer ceramic capacitor according to the present invention will be described in detail. FIG. 4 is a flow chart showing the method for manufacturing a multilayer ceramic capacitor of the present invention.

The multilayer ceramic capacitor of the present invention is manufactured by firing a capacitor body forming body wherein green sheets and internal electrode patterns are alternately laminated. The green sheets contain a mixture of dielectric powder mainly composed of barium titanate and glass powder. In the present invention, it is preferable that the dielectric powder has a mean grain size of not more than 0.2 μm while glass powder has a softening point of not less than 650° C. and a thermal expansion coefficient of not more than $9.5 \times 10^{-6}$/° C.

In the above method for manufacturing a multilayer ceramic capacitor, preferably, dielectric powder is plated with an oxide of Mg, a rare earth element and Mn, and when barium site is A and titanate site is B in barium titanate dielectric powder, the relation of A/B≧1 in mole ratio is satisfied and glass powder has a mean grain size of not more than 0.3 μm.

The manufacturing method of the present invention will be described as follows, in reference to each step shown in FIG. 4.

Step (a): First, raw material powder shown below is mixed with organic resin such as polyvinyl butyral resin or solvent such as toluene and alcohol, using a ball mill, to prepare ceramic slurry. Next, through sheet forming method such as doctor blade method or die coating method, a ceramic green sheet 21 is formed on a carrier film 22. It is preferable that the ceramic green sheet 21 is 1 to 2 μm thick in order to make a dielectric layer thinner for larger capacity and maintain high insulation.

Barium titanate powder (BT powder) is dielectric powder used in the manufacturing method of the present invention, and raw material powder represented as $BaTiO_3$. In the BT powder, preferably, its components A site (barium) and B site (titanate) satisfy the relation of A/B≧1 in mole ratio, especially, A/B≧1.003 in terms of inhibiting grain growth during firing. This dielectric powder is obtained through one synthetic method selected from solid phase method, liquid phase method (including a producing method through oxalate), hydrothermal synthesis method and the like. Among these, dielectric powder obtained through hydrothermal synthesis method is desirable because the dielectric powder so obtained has narrow grain size distribution and high crystallinity.

It is important that the grain size distribution of BT powder is not more than 0.2 μm so that the dielectric layer 5 can be easily made thinner, and desirably, 0.05 to 0.2 μm so as to improve the relative dielectric constant by making the c/a ratio higher and attain higher insulation.

Regarding dielectric powder having a high relative dielectric constant, powder wherein a peak indicating a cubic crystal is larger than a peak indicating a tetragonal crystal in the evaluation on crystallinity by X-ray diffraction, can make the lattice constant ratio c/a higher. Preferably, 0.04 to 0.3 parts by weight of Mg, 0.5 to 2 parts by weight of a rare earth element and 0.04 to 0.3 parts by weight of Mn respectively to 100 parts by weight of BT powder are added to plate the above-mentioned dielectric powder.

Glass powder to be added to the dielectric powder may have a softening point of not less than 650° C. A softening point of lower than 650° C. allows glass softening and flow to occur for long hours during firing, and the grain growth of barium titanate to be easily caused. For the above reason and in terms of suppressing aggregation caused by softened glass component itself and increasing dispersibility in a dielectric ceramics, the softening point is preferably not less than 690° C.

It is preferable that the glass powder according to the present invention has a thermal expansion coefficient of not more than $9.5 \times 10^{-6}$/° C. at room temperature to 300° C. Effects are shown when the thermal expansion coefficient of glass component is not more than $9.5 \times 10^{-6}$/° C., and greater effects are shown in improving a dielectric constant when it is not more than $9 \times 10^{-6}$/° C. Moreover, when the softening point of the above glass is higher, for example, not less than 700° C. or not less than 800° C., more stress is added between the crystal grains 9 and the grain boundary layer 11 in cooling process and dielectric characteristic is more effectively controlled.

On the contrary, when the thermal expansion coefficient is larger than $9.5 \times 10^{-6}$/° C. (the temperature range of room temperature to 300° C.), the difference with the thermal expansion coefficient ($12.5 \times 10^{-6}$/° C.) of dielectric powder becomes smaller, which makes the stress to dielectric crystal grains smaller, leading to a decrease in relative dielectric constant.

In terms of reducing the grain size difference with barium titanate powder increasing dispersibility, it is desirable that the above glass powder has a mean grain size of not more than 0.3 μm.

It is preferable that glass powder is mainly composed of $SiO_2$, BaO, CaO and $B_2O_3$. The preferable composition is 40 to 70 mole % of $SiO_2$, 5 to 40 mole % of BaO, 5 to 40 mole % of CaO and 1 to 30 mole % of $B_2O_3$. In order to keep the softening point high, it is preferable not to contain Li component.

In the present invention, besides the above composition, glass powder containing no Si component, 10 to 40 mole % of BaO, 10 to 40 mole % of CaO and 30 to 60 mole % of $B_2O_3$ can be suitably used in order to satisfy the above softening point and thermal expansion coefficient. It is preferable in terms of increasing the sinterability of a dielectric ceramics that 0.7 to 2 parts by weight of glass powder is added to 100 parts by weight of dielectric powder that is BT powder.

As above, in the barium titanate powder according to the present invention, the ratio of A/B is preferably not less than 1, in particular, not less than 1.003. Such powder can be prepared by fixing barium carbonate powder etc. to the surface of barium titanate powder. It is preferable in terms of inhibiting grain growth that the powder to be fixed is 0.1 to 1 parts by weight to 100 parts by weight of BT powder.

Step (b): A rectangular internal electrode pattern 23 is formed through printing on the principal surface of the ceramic green sheet 21 obtained by the step (a). Conductor paste to be an internal electrode pattern 23 is mainly composed of Ni, Cu or their alloy powder, and prepared by adding organic binder, solvent and dispersant thereto. As metal powder, Ni is preferable in terms of enabling co-firing with the above dielectric powder and reducing cost. Preferably, the internal electrode pattern 23 has a thickness of not more than 1 μm in order to attain a smaller-sized multilayer ceramic capacitor and reduce gaps caused by the internal electrode pattern 23.

According to the present invention, in order to eliminate the gaps caused by the internal electrode pattern 23 on the ceramic green sheet 21, it is preferable to form, around an internal electrode pattern, a ceramic pattern 25 substantially as thick as the internal electrode pattern 23. In terms of obtaining the same firing shrinkage in co-firing, it is preferable to use the above-mentioned dielectric powder as ceramic component constituting the ceramic pattern 25.

Step (c): A desired number of ceramic green sheets 21 wherein the internal electrode patterns 23 are formed are laminated. Both on the upper and lower sides of the laminate so obtained, a plurality of ceramic green sheets 21 having no internal electrode patterns 23 are laminated, so that the same number of layers can be laminated on the upper and lower sides of the laminate. Thereby, a preliminary laminated body is formed. In the preliminary laminated body, internal electrode patterns alternately shift their position half a pattern in a long direction. With this laminating method, the internal electrode patterns 23 can be alternately exposed on the end face of the after-cutting laminated body.

In the present invention, beside the above-mentioned method of forming the internal electrode pattern 23 on the principal surface of the ceramic green sheet 21 beforehand and then laminating, the following method can be employed: after the ceramic green sheet 21 is attached firmly to a base material below, the internal electrode pattern 23 is printed and dried; then, ceramic green sheets 21 having no internal electrode patterns 23 printed are laminated on and tentatively attached to the above printed and dried internal electrode patterns; and in this manner, attachment of a ceramic green sheet 21 and printing of an internal electrode pattern 23 consecutively take place.

Next, the preliminary laminated body is pressed under the condition of a higher temperature and a higher pressure than the temperature and pressure in the above preliminary laminating process, thereby forming a laminated body 29 wherein ceramic green sheets 21 and internal electrode patterns 23 are firmly attached.

The laminated body 29 is cut along the section line h, that is, in the both directions vertical and parallel to the long side of the internal electrode pattern 23, around the center of the ceramic pattern 25 formed in the laminated body 29. A capacitor body forming body is formed so as to expose the ends of the internal electrode patterns. FIGS. 4(c-1) and (c-2) are respectively the sectional views taken along the vertical and parallel directions to the long side of the internal electrode pattern 23. On the other hand, in the widest portion of the internal electrode pattern 23, these internal electrode patterns are not exposed on the side margin portion side.

This capacitor body forming body is fired under the condition of a predetermined atmosphere and a temperature to form a capacitor body. In some cases, the edges of the capacitor body are cut off, and barrel polishing may be carried out so as to expose internal electrode layers that are exposed from the opposing end faces in the capacitor body. Preferably, debinding is performed at a temperature of up to 500° C. and at a temperature raising rate of 5 to 20° C./h; the maximum temperature of firing is in the range of 1150 to 1300° C.; the temperature raising rate from debinding to the maximum temperature is 200 to 500° C./h; holding time at the maximum temperature is 0.5 to 4 hours; the temperature lowering rate from the maximum temperature to 1000° C. is 200 to 500° C./h; the atmosphere is hydrogen-nitrogen; heat treatment (reoxidation treatment) after firing is performed at a maximum temperature of 900 to 1100° C. and in nitrogen atmosphere.

Then, external electrodes 3 are formed on the opposing end faces of this capacitor body 1 by applying external electrode paste and baking. In addition, to attain better packaging, plated films are formed on the surface of this external electrode 3.

The above-mentioned crystal grain 9 according to the present invention is generally likely to cause grain growth due to atomic diffusion during sintering, which makes it difficult to obtain a sintered body having a very small grain size and high density. In particular, when raw material grain size to be used is smaller than submicron level, the surface area becomes large compared to the grain volume and the surface energy is increased, resulting in energetically unstable conditions. During firing, grain growth due to atomic diffusion occurs, decreasing the surface area and surface energy, which leads to stability. Therefore, it is difficult to obtain a sintered body having a very small grain size and high density, wherein grain growth is likely to occur.

Specifically, a sintered body composed of a crystal grain 9 having a very small grain size of 0.2 μm or less easily goes into solid solution and causes grain growth. If some deterrent to atom transfer among grains is not put in among grains, a sintered body having a large grain size of over 1 μm is formed, and it is difficult to obtain a sintered body having high density and a very small grain size of not more than submictron level. In the present invention, as well as raw materials for very small crystals, additives whose softening point is closer to a sintering temperature and whose thermal expansion coefficient is smaller than that of barium titanate are selected and firing conditions are adjusted in order to obtain a sintered body composed of very small grains that are commensurate with a crystal grain size of raw materials. When the element ratio of A site in barium titanate is higher, more barium is present on the grain surface. This barium diffuses on the grain surface and forms liquid phase, which facilitates sintering and inhibits atom transfer of additives including Ba, Ti or Mg, Mn, a rare earth element and the like in crystal grains 9 of BT as mother phase that are present in the grain boundary and its vicinity, as well as grain growth.

As a result, crystal phase having not only barium but also Mg and a rare earth element diffused in the form of solid solution on the surface of the crystal grains 9 is formed. In other words, core-shell structure is formed where Mg and a rare earth element are unevenly distributed on the grain surface. The formation of such core-shell structure can be checked by observing these crystal grains 9 with a transmission electron microscope.

EXAMPLES

The following examples illustrate the manner in which the present invention can be practiced. It is understood, however, that the examples are for the purpose of illustration and the invention is not to be regarded as limited to any of the specific materials or condition therein.

Example I

Regarding the dielectric ceramics of the present invention, the effect of volume per unit cell represented by a product of lattice constant (a, b, c) figured out from X-ray diffraction pattern was checked. First, dielectric primary powders obtained through sol-gel method, hydrothermal synthesis method, oxalic acid method and solid phase method shown in Table 1 were prepared. These powders were prepared so as to have the ratio Ba/Ti of 1.005.

The next step was to dry powders. When a zeolitic drying agent was not employed, the above powders went through preliminary drying at atmospheric pressure and in the atmosphere of temperature 200° C.

Meanwhile when a zeolitic drying agent was employed, the dielectric primary powders so prepared went through dry-heat process at atmospheric pressure and 400° C. The zeolitic drying agent used was mainly composed of aluminosilicate and had the specific surface of 600 $m^2$/g. Thereby, dielectric powders were obtained. The quantity of the zeolitic drying agent was 10 parts by weight to 100 parts by weight of dielectric primary powder.

Using the dielectric powders obtained as above, 1 mm-thick forming bodies having a diameter of 15 mm were obtained through molding, and hot-pressed under the condition of a temperature 900° C. and a pressure $10^7$ Pa. Subsequently, oxidation treatment was carried out at 800° C. in the atmosphere.

As for the dielectric ceramics so obtained, the mean grain size of crystal grains was measured with a scanning electron microscope. Measurement was performed at 1000 points per sample to figure out a mean value. The mean grain size was 0.1 μm.

Then, the volume per unit cell V was figured out by X-ray diffraction measurement on the obtained samples. Setting a diffraction angle to 44 to 46° and finding out lattice constant a, b and c, the volume of unit cell was figured out. Calculating the difference between this X-ray diffraction peak and the X-ray diffraction peak of the diffraction angle figured out for barium titanate single crystal, stress was found out. Every sample in the present invention had a stress of 1.5 MPa. Moreover, according to Rietveld analysis, cubic crystals and tetragonal crystals coexisted in every crystal grain constituting the sample dielectric ceramics of the present invention. The lattice constant ratio c/a was 1.008 (in Sample No. 6) and 1.009 (in Sample No. 7). The samples prepared through the method out of the scope of the present invention had the lattice constant ratio c/a of 1.003 to 1.007.

Next, electrodes were formed, by polishing the after-firing dielectric ceramics, measuring the size and weight and applying Ga—In electrode on the opposing surface. Using a LCR meter, the electrostatic capacity of the dielectric ceramics was measured at a frequency of 1 kHz and a voltage of 1V for one minute. Relative dielectric constant was figured out from the diameter and thickness of the sample, and the electrostatic capacity. In addition, the temperature characteristic (TCC) of relative dielectric constant was evaluated. The results were presented in Table 1.

TABLE 1

| | Manufacturing method | Drying condition | Moisture content after drying (%) | Volume per unit cell (nm³) | εr | Temperature characteristic (20° C./85° C.) | Density of ceramics (g/cm³) | Mean grain size of ceramics (μm) |
|---|---|---|---|---|---|---|---|---|
| 1* | Sol-gel method | No zeolite | 0.56 | 0.0655 | 1420 | −4.40 | 5.89 | 0.10 |
| 2* | Hydrothermal synthesis method | No zeolite | 0.46 | 0.0652 | 1503 | −10.98 | 5.90 | 0.16 |
| 3* | Oxalic acid method | No zeolite | 0.50 | 0.0653 | 1414 | −3.92 | 5.85 | 0.10 |
| 4* | Solid phase method | No zeolite | 0.48 | 0.0652 | 1433 | −4.06 | 5.87 | 0.11 |
| 5* | Solid phase method | No zeolite | 0.44 | 0.0648 | 1461 | −8.01 | 5.93 | 0.14 |
| 6 | Oxalic acid method + Dry-heat process | Zeolite | 0.23 | 0.0643 | 1565 | 2.19 | 5.89 | 0.10 |
| 7 | Sol-gel method + Dry-heat process | Zeolite | 0.21 | 0.0640 | 1572 | 1.22 | 5.89 | 0.10 |

Samples marked '*' are out of the scope of the present invention.

As apparent from the results of Table 1, the dielectric ceramics obtained by using dielectric primary powder that went through dry-heat process with a zeolitic drying agent showed the followings: the moisture content of dielectric primary powder was 0.21% and 0.23%; the mean grain size of crystal grains was not more than 0.2 μm; the volume per unit cell V represented by a product of lattice constant (a, b, c) figured out from X-ray diffraction pattern was in the range of 0.064 to 0.0643 nm³; the relative dielectric constant was not less than 1565; and the temperature characteristic as a rate of change to the relative dielectric constant in 25° C. as a standard was 1.22% and 2.19%.

On the contrary, in case of the dielectric powder prepared through conventional manufacturing method, the results were as follows; the moisture content of dielectric primary powder was 0.44 to 0.56%; the mean grain size of crystal grains constituting the dielectric ceramics was not more than 0.2 μm; the volume per unit cell V represented by a product of lattice constant (a, b, c) figured out from X-ray diffraction pattern was 0.0643 nm³ or more; the relative dielectric constant was 1500 or lower; and the temperature characteristic as a rate of change to the relative dielectric constant in 25° C. as a standard was −3.92 to −10.98% and larger in absolute value compared to the samples of the present invention.

Example 2

First, to check the effect of glass softening point and thermal expansion coefficient, dielectric powder was molded into a 1 mm-thick tablet-like shape having a diameter of 12 mm and fired. Then, evaluation was made. The results were presented as dielectric ceramics in Tables 2 and 3. The mean grain size of barium titanate that was used, the ratio A/B, the ratio c/a, the added amount, firing temperature and glass composition were shown in Tables 2 and 3. By plating, 0.1 parts by weight of Mg, 1 part by weight of Y and 0.2 parts by weight of Mn in terms of oxide to 100 parts by weight of barium titanate powder were contained in the barium titanate powder used here. 1 part by weight of glass component to 100 parts by weight of barium titanate powder was contained in glass powder. The ratio of A site/B site in BT powder used here was 1.003 or 1.001.

The softening point of glass powder was measured with a TG-DTA after molding glass powder into a tablet-like shape. The thermal expansion coefficient was measured in the range from room temperature to 300° C. with a thermal expansion coefficient measuring device after molding glass powder into a tablet-like shape.

A mixed solvent of toluene and alcohol was added, and using a zirconia ball, the above powder went through wet mixing. Polyvinyl butyral resin and a mixed solvent of toluene and alcohol were added to the powder that went through wet mixing, and a forming body was prepared by wet mixing with a zirconia ball in the same manner, to make a comparison.

The multilayer ceramic capacitor of the present invention was prepared as follows. Barium titanate powder and glass powder used to prepare the above dielectric ceramics were used.

Using a 5 mm-diameter zirconia ball, the mixture of barium titanate powder and glass powder went through wet mixing with a mixed solvent of toluene and alcohol added. Next, polyvinyl butyral resin and a mixed solvent of toluene and alcohol were added to the powder that went through wet mixing. In the same manner, using a zirconia ball, wet mixing was carried out to prepare ceramic slurry. Through doctor blade method, a 2 μm-thick ceramic green sheet was prepared. Then, a plurality of rectangular internal electrode patterns mainly composed of Ni were formed on the upper surface of this ceramic green sheet.

A hundred sheets of ceramic green sheet having internal electrode patterns printed were laminated. Each on the upper and lower surfaces, twenty sheets of 5 μm-thick ceramic green sheet having no internal electrode patterns printed were laminated, and, using a pressing machine, laminated at a time under the condition of a temperature 60° C. and a pressure $10^7$ Pa for 10 minutes followed by cutting to a predetermined size.

Subsequently, a forming body and a multilayer forming body that were made of the above powder underwent debinding process at a temperature raising rate of 10° C./h up to 500° C. in the atmosphere. Setting the temperature raising rate from 500° C. to 300° C./h, firing was performed at 1140 to 1300° C. in hydrogen-nitrogen atmosphere for two hours, followed by cooling down to 1000° C. at a temperature lowering rate of 300° C./h, reoxidation treatment at 1000° C. in nitrogen atmosphere for four hours and cooling at a temperature lowering rate of 300° C./h. Thus, a capacitor body was prepared. This capacitor body had the size of 2×1×1 mm³, and a dielectric layer was 1.5 μm thick.

After the fired body of an electronic component underwent barrel polishing, external electrode paste containing Cu powder and glass was applied to the both ends of the electronic component body followed by baking at 850° C. to form external electrodes. Subsequently, by using an electrolytic barrel machine, Ni and Sn were plated in this order on the surface of the external electrodes, thereby manufacturing a multilayer ceramic capacitor. The dielectric layer of the multilayer ceramic capacitor had a thickness of 1.5 μm.

The multilayer ceramic capacitors were evaluated as below. A rare earth element (Y) in a BT crystal grain constituting the dielectric layer of the present invention was contained with the highest concentration in the grain boundary layer that is the grain surface and had the concentration gradient of not less than 0.7 atomic %/nm from the surface to the interior of the crystal grain.

The unit cell volume ratio was measured with an X-ray diffractometer, after gathering 30 pieces of capacitor bodies so prepared, dividing each of the samples into two and placing them on a stage. Then, this capacitor body was ground so that the dielectric layer had a mean grain size of about not more than 1 μm, and the grains so obtained were measured in the same manner.

Electrostatic capacity, relative dielectric constant and the temperature characteristic of relative dielectric constant were measured under the condition of a frequency 1.0 kHz and a measured voltage 0.5Vrms. The relative dielectric constant was derived from electrostatic capacity, the effective area of an internal electrode layer and the thickness of a dielectric layer. The mean grain size of crystal grains constituting a dielectric layer was found out with a scanning electron microscope (SEM). Etching the polished surface, 20 pieces of crystal grains were randomly selected from electron microscopic pictures, and the maximum diameter of each crystal grain and the average value (D50) were figured out through intercept method.

To evaluate grain boundary phase, measurement was separately performed, using the above alternating-current impedance method. In this case, high temperature load condition was a temperature of 250° C. and a voltage of 3V to be added to the external electrodes of a multilayer ceramic capacitor. Measurement was performed at a voltage of 0.1 V and a frequency of 10 mHz to 10 kHz. Before and after this process, alternating-current impedance of 30 samples was evaluated.

For comparative examples, using glass powder having a softening point of 650° C. or lower and a thermal expansion coefficient of $9.5 \times 10^{-6}$/° C. or more, the same manufacturing method as above was applied. The results were presented in Tables 2 to 5.

TABLE 2

| | | | | | Before firing | | | | | | | | |
|---|---|---|---|---|---|---|---|---|---|---|---|---|---|
| Sample No. | Type of sample | Mean grain size of BaTiO₃ powder | A/B site ratio(A:Ba, B:Ti) | c/a ratio | Glass powder composition (mole %) | | | | | | | Glass softening point (° C.) | Thermal expansion coefficient (×10⁻⁶/° C.) |
| | | | | | $SiO_2$ | BaO | CaO | $Li_2O$ | $B_2O_3$ | $Y_2O_3$ | $TiO_2$ | | |
| 1 | Ceramics | 0.2 μm | 1.003 | 1.005 | 50 | 20 | 20 | — | — | 10 | — | 884 | 8.1 |
| 2 | Ceramics | 0.2 μm | 1.003 | 1.005 | 50 | 20 | 20 | — | 10 | — | — | 702 | 8.5 |
| 3 | Ceramics | 0.2 μm | 1.003 | 1.005 | 58 | 20 | 20 | — | 2 | — | — | 771 | 9.0 |
| 4 | Ceramics | 0.2 μm | 1.003 | 1.005 | 40 | 20 | 30 | — | — | 10 | — | 889 | 9.1 |
| 5 | Ceramics | 0.2 μm | 1.003 | 1.005 | 50 | 20 | 30 | — | — | — | — | 746 | 9.3 |
| 6 | Ceramics | 0.2 μm | 1.003 | 1.005 | 55 | 22 | 23 | — | — | — | — | 755 | 9.4 |
| *7 | Ceramics | 0.2 μm | 1.003 | 1.005 | — | 20 | 30 | — | 40 | — | 10 | 601 | 9.8 |
| *8 | Ceramics | 0.2 μm | 1.003 | 1.005 | 50 | 10 | 30 | 10 | — | — | — | 623 | 10.2 |
| *9 | Ceramics | 0.2 μm | 1.003 | 1.005 | 50 | 20 | 20 | 10 | — | — | — | 606 | 10.4 |
| *10 | Ceramics | 0.2 μm | 1.003 | 1.005 | 45 | 20 | 25 | 10 | — | — | — | 606 | 10.7 |
| *11 | Ceramics | 0.2 μm | 1.003 | 1.005 | — | 30 | 10 | 10 | 50 | — | — | 580 | 12.0 |
| *12 | Ceramics | 0.2 μm | 1.003 | 1.005 | — | 20 | 20 | 10 | 50 | — | — | 527 | 11.2 |

Samples marked "*" are out of the scope of the present invention.

TABLE 3

| | | | | | Before firing | | | | | | | | |
|---|---|---|---|---|---|---|---|---|---|---|---|---|---|
| Sample No. | Type of sample | Mean grain size of BaTiO₃ powder | A/B site ratio(A:Ba, B:Ti) | c/a ratio | Glass powder composition (mole %) | | | | | | | Glass softening point (° C.) | Thermal expansion coefficient (×10⁻⁶/° C.) |
| | | | | | $SiO_2$ | BaO | CaO | $Li_2O$ | $B_2O_3$ | $Y_2O_3$ | $TiO_2$ | | |
| 13 | Ceramics | 0.2 μm | 1.003 | 1.005 | — | 20 | 30 | — | 50 | — | — | 625 | 9.3 |
| 14 | Ceramics | 0.2 μm | 1.001 | 1.005 | 50 | 20 | 20 | — | 10 | — | — | 702 | 8.5 |
| 15 | Ceramics | 0.2 μm | 1.003 | 1.003 | 50 | 20 | 20 | — | 10 | — | — | 702 | 8.5 |
| *16 | Capacitor | 0.3 μm | 1.003 | 1.005 | 50 | 20 | 20 | — | 10 | — | — | 702 | 8.5 |
| 17 | Capacitor | 0.2 μm | 1.003 | 1.005 | 50 | 20 | 20 | — | 10 | — | — | 702 | 8.5 |
| *18 | Capacitor | 0.3 μm | 1.003 | 1.005 | 50 | 20 | 30 | — | — | — | — | 746 | 9.3 |
| 19 | Capacitor | 0.2 μm | 1.003 | 1.005 | 50 | 20 | 30 | — | — | — | — | 746 | 9.3 |
| *20 | Capacitor | 0.3 μm | 1.003 | 1.005 | — | 20 | 30 | — | 50 | — | — | 625 | 9.3 |

TABLE 3-continued

| | | Before firing | | | | | | | | | | |
|---|---|---|---|---|---|---|---|---|---|---|---|---|
| Sample No. | Type of sample | Mean grain size of BaTiO₃ powder | A/B site ratio(A:Ba, B:Ti) | c/a ratio | Glass powder composition (mole %) | | | | | | | Glass softening point (° C.) | Thermal expansion coefficient (×10⁻⁶/° C.) |
| | | | | | SiO₂ | BaO | CaO | Li₂O | B₂O₃ | Y₂O₃ | TiO₂ | | |
| 21  | Capacitor | 0.2 μm | 1.003 | 1.005 | —  | 20 | 30 | —  | 50 | — | — | 625 | 9.3 |
| *21 | Capacitor | 0.3 μm | 1.003 | 1.005 | 50 | 20 | 20 | 10 | —  | — | — | 606 | 10.4 |
| *22 | Capacitor | 0.2 μm | 1.003 | 1.005 | 50 | 20 | 20 | 10 | —  | — | — | 606 | 10.4 |

Samples marked '*' are out of the scope of the present invention.

TABLE 4

| | | After firing | | | | | |
|---|---|---|---|---|---|---|---|
| Sample No. | Type of sample | Firing temperature (° C.) | Grain size of BT crystal grain (D50) μm | Unit cell volume ratio (Ceramics/ Ground powder) | εr (25° C.) | εr rate of change (−55° C./85° C.) | (1) Change in resistivity %/min. |
| 1   | Ceramics | 1250 | 0.19 | 1.0088 | 2212 | −19.3/+12.4 | — |
| 2   | Ceramics | 1260 | 0.19 | 1.0072 | 2190 | −17.6/+4.5  | — |
| 3   | Ceramics | 1280 | 0.19 | 1.0079 | 2140 | −17.5/8.8   | — |
| 4   | Ceramics | 1300 | 0.19 | 1.0089 | 2110 | −16.3/−2.1  | — |
| 5   | Ceramics | 1300 | 0.19 | 1.0063 | 2045 | −19.8/+14.5 | — |
| 6   | Ceramics | 1300 | 0.19 | 1.0059 | 2020 | −16.1/9.1   | — |
| *7  | Ceramics | 1200 | 0.21 | 1.0039 | 1833 | −21.3/5.4   | — |
| *8  | Ceramics | 1140 | 0.22 | 1.0039 | 1910 | −25.4/+6.4  | — |
| *9  | Ceramics | 1230 | 0.2  | 1.0035 | 1851 | −21/−3.3    | — |
| *10 | Ceramics | 1170 | 0.22 | 1.0020 | 1930 | −24.8/+0.6  | — |
| *11 | Ceramics | 1145 | 0.2  | 1.0020 | 1775 | −21.1/+23.1 | — |
| *12 | Ceramics | 1145 | 0.21 | 1.0012 | 1910 | −21.5/+13.0 | — |

Samples marked '*' are out of the scope of the present invention.
(1) Evaluation on grain boundary layer through alternating-current impedance method, Change in resistivity before and after high temperature load process

TABLE 5

| | | After firing | | | | | |
|---|---|---|---|---|---|---|---|
| Sample No. | Type of sample | Firing temperature (° C.) | Grain size of BT crystal grain (D50) μm | Unit cell volume ratio (Ceramics/ Ground powder) | εr (25° C.) | εr rate of change (−55° C./85° C.) | (1) Change in resistivity %/min. |
| 13  | Ceramics  | 1250 | 0.19 | 1.0060 | 2130 | −17.9/+4.6  | —     |
| 14  | Ceramics  | 1260 | 0.19 | 1.0070 | 2140 | −19.6/+6.5  | —     |
| 15  | Ceramics  | 1260 | 0.19 | 1.0069 | 2010 | −17.8/+4.6  | —     |
| *16 | Capacitor | 1255 | 0.26 | 1.0072 | 3300 | −11.0/−6.0  | −0.46 |
| 17  | Capacitor | 1170 | 0.18 | 1.0082 | 3220 | −9.0/−7.3   | −0.35 |
| *18 | Capacitor | 1280 | 0.25 | 1.0063 | 3280 | −12.2/+5.5  | −0.48 |
| 19  | Capacitor | 1200 | 0.18 | 1.0087 | 3030 | −10.2/+6.7  | −0.42 |
| *20 | Capacitor | 1150 | 0.26 | 1.0069 | 3190 | −12.0/−7.0  | −0.5  |
| 21  | Capacitor | 1120 | 0.18 | 1.0056 | 3130 | −12.4/−7.4  | −0.43 |
| *21 | Capacitor | 1260 | 0.29 | 1.0035 | 2600 | −14.8/−1.3  | −0.66 |
| *22 | Capacitor | 1140 | 0.2  | 1.0048 | 2300 | −11.5/−4.2  | −0.7  |

Samples marked '*' are out of the scope of the present invention.
(1) Evaluation on grain boundary layer through alternating-current impedance method, Change in resistivity before and after high temperature load process As apparent from the results of Tables 2 to 5, the dielectric ceramics made of dielectric material that was prepared with glass powder defined in the manufacturing method of the present invention showed a unit cell volume ratio of not less than 1.0059, a relative dielectric constant of not less than 2010 and a rate of change of −19.8 to +14.5% in relative dielectric constant. Furthermore, even when the same glass powder was used, BT powder having a high ratio of A/B allowed the temperature characteristic of relative dielectric constant to be reduced, and a high ratio of c/a led to improvement in relative dielectric constant.

On the other hand, when glass powder out of the scope of the manufacturing method in the present invention was used, the unit cell volume ratio was not more than 1.0039, and the relative dielectric constant was lower than 2000 or the temperature characteristic of relative dielectric constant was a large value of not less than −21% at the lower temperature side.

The multilayer ceramic capacitor comprising the dielectric layer of the present invention showed a unit cell volume ratio of not less than 1.0056, a relative dielectric constant of not less than 3030, and a temperature characteristic of not more than −12.4% at −55° C. and not more than 6.7% at 85° C., having good temperature characteristic and a rate of change of not more than −0.43%/min. in alternating-current impedance.

On the contrary, the multilayer ceramic capacitor comprising the dielectric layer that was prepared with glass powder having a softening point of 650° C. or lower and a thermal expansion coefficient of 9.5×10$^{-6}$/° C. or more had a unit cell volume ratio of not more than 1.0048, a lower relative dielectric constant than the capacitor of the present invention and a large temperature characteristic of relative dielectric constant.

What is claimed is:

1. A multilayer ceramic capacitor, comprising:
   a capacitor body wherein dielectric layers and internal electrode layers are alternately laminated, the dielectric layers having a plurality of crystal grains sintered through a grain boundary layer; and
   an external electrode that is formed at both ends of the capacitor body,
   wherein (a) crystal grains constituting the dielectric layers have a mean grain size of not more than 0.2 μm; (b) the crystal grains are mainly composed of barium titanate; and (c) when the volume per unit cell $V_{bulk}$ is represented by a product of lattice constant (a, b, c) figured out from the X-ray diffraction pattern of the dielectric layers and the volume per unit cell $V_{powder}$ is represented by a product of lattice constant (a, b, c) figured out from the X-ray diffraction pattern of crystal grains obtained by grinding the dielectric layers, $V_{bulk}$ and $V_{powder}$ satisfy the relation Of $V_{bulk}/V_{powder} \geq 1.005$.

2. The multilayer ceramic capacitor according to claim 1, wherein the mole ratio of A site for barium and B site for titanate in barium titanate constituting crystal grains satisfies the relation of A site/B site$\geq$1.

3. The multilayer ceramic capacitor according to claim 1, wherein the lattice constant ratio of a dielectric layer satisfies the relation of c/a$\geq$1.005.

4. The multilayer ceramic capacitor according to claim 1, wherein a rate of resistance decrease of grain boundary in the dielectric layer is not more than 0.5%/min. in alternating-current impedance measurement before and after exposing a multilayer ceramic capacitor to the high temperature loading atmosphere of a higher temperature than Curie temperature shown by perovskite barium titanate crystal grains that constitute the dielectric layer, and a voltage as high as not less than one third of the rated voltage of the multilayer ceramic capacitor.

* * * * *